(12) United States Patent
Wallström et al.

(10) Patent No.: US 7,255,518 B2
(45) Date of Patent: Aug. 14, 2007

(54) INSERT SEAT FORMED OF RIDGES

(75) Inventors: Lars-Gunnar Wallström, Sandviken (SE); Lennart Wihlborg, Ockelbo (SE)

(73) Assignee: Sandvik Intellectual Property AB, Sandviken (SE)

( * ) Notice: Subject to any disclaimer, the term of this patent is extended or adjusted under 35 U.S.C. 154(b) by 0 days.

(21) Appl. No.: 11/211,592

(22) Filed: Aug. 26, 2005

(65) Prior Publication Data

US 2006/0088390 A1 Apr. 27, 2006

(30) Foreign Application Priority Data

Aug. 30, 2004 (SE) .................... 0402102

(51) Int. Cl.
*B23B 27/16* (2006.01)

(52) U.S. Cl. ............ 407/103; 407/101; 407/102; 407/104; 407/107

(58) Field of Classification Search ............ 407/85, 407/99, 107, 101–104, 109, 47, 48; *B23B 27/16*
See application file for complete search history.

(56) References Cited

U.S. PATENT DOCUMENTS

| | | | | |
|---|---|---|---|---|
| 3,268,977 A | * | 8/1966 | Diemond | 407/5 |
| 5,586,844 A | * | 12/1996 | Nyman | 407/105 |
| 6,004,081 A | * | 12/1999 | Hellstrom et al. | 407/103 |
| 6,017,171 A | | 1/2000 | Karlsson | |
| 6,050,751 A | * | 4/2000 | Hellstrom | 407/104 |
| 6,332,385 B1 | * | 12/2001 | Kautto et al. | 82/1.11 |
| 6,540,448 B2 | | 4/2003 | Johnson | 407/35 |
| 6,607,333 B2 | * | 8/2003 | Satran et al. | 407/33 |
| 2004/0028486 A1 | * | 2/2004 | Englund | 407/90 |
| 2005/0232711 A1 | * | 10/2005 | Shaheen | 407/107 |
| 2005/0238444 A1 | * | 10/2005 | Virtanen et al. | 407/110 |

FOREIGN PATENT DOCUMENTS

| | | |
|---|---|---|
| SE | 505 511 C2 | 9/1997 |
| WO | 00/23218 | 4/2000 |
| WO | 2004/060595 A1 | 7/2004 |

* cited by examiner

*Primary Examiner*—Monica Carter
*Assistant Examiner*—Sara Addisu
(74) *Attorney, Agent, or Firm*—Drinker Biddle & Reath LLP

(57) ABSTRACT

A tool body includes an insert seat for receiving a cutting insert for chip-removing machining. The insert seat includes a bottom surface and support surfaces upstanding from the bottom surface. Each support surface comprises at least three ridges separated by grooves. Each groove has a depth greater than zero and no greater than 0.015 mm. An insert mounted in the seat by a screw has a center hole whose axis is offset from the axis of a threaded hole of the body in which the screw is connected. That offset distance creates a pre-stress of the insert toward the ridges. The depth of the grooves (i.e., the height of the ridges) is substantially less than the distance of the offset.

13 Claims, 6 Drawing Sheets

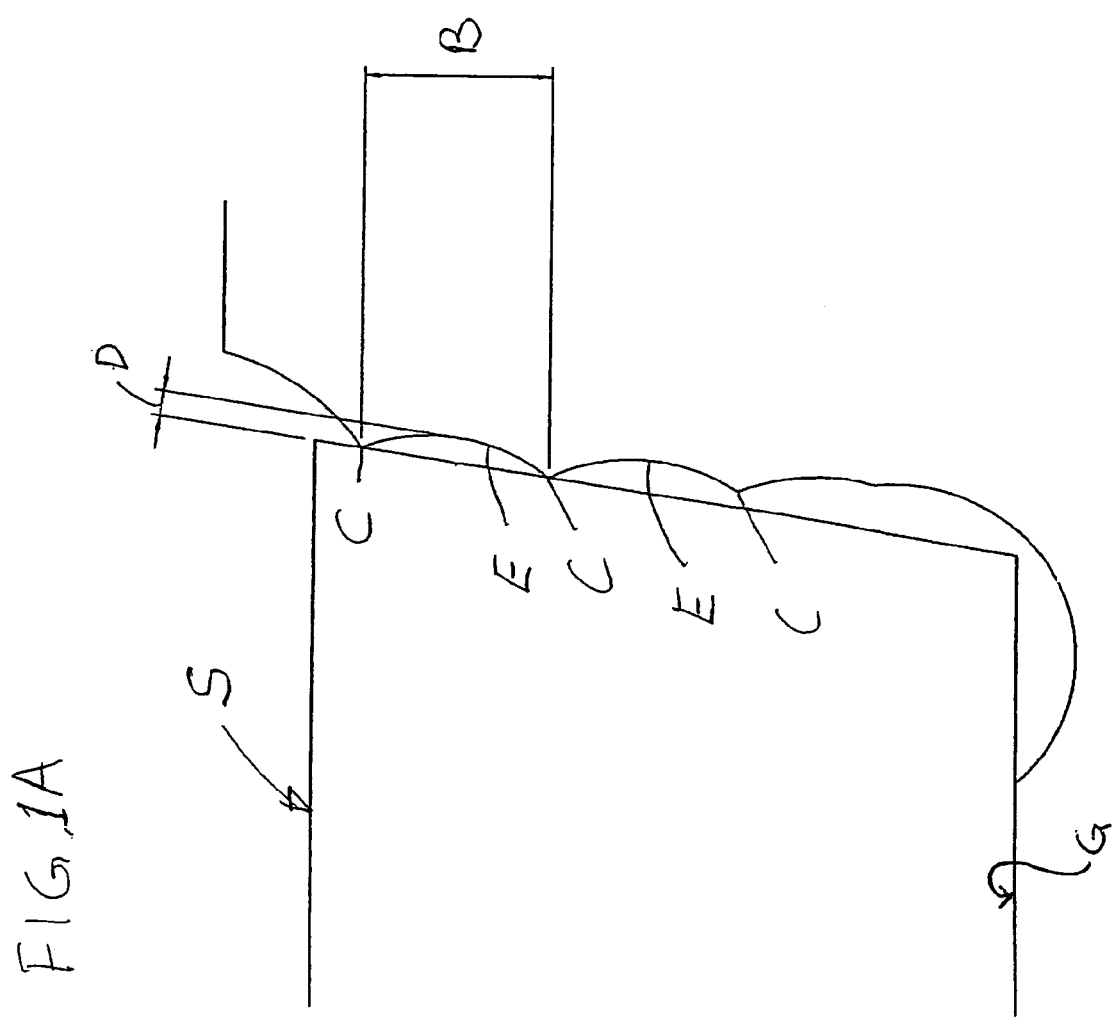

INSERT SEAT FORMED OF RIDGES

The present application claims priority under 35 U.S.C. § 119 to patent application Serial No. 0402102-8 filed in Sweden on Aug. 30, 2004.

TECHNICAL FIELD OF THE INVENTION

The present invention relates to an insert seat formed in a tool body for chip-removing machining, the insert seat comprising a bottom surface and support surfaces, which have an extension along a part of the circumference defined by the bottom surface. Each support surface comprises grooves and ridges defining the grooves. The invention also relates to a tool for chip-removing machining, which comprises at least one insert seat.

STATE OF THE ART

From SE-C-505 511 (corresponding to U.S. Pat. No. 6,017,171), a milling cutter body and a method for the manufacture of said milling cutter body are previously known. A characteristic feature of said milling cutter body is that the lateral support of the insert seat is manufactured by means of a ball nose end mill. Thereby, due to scalloping, a number of grooves are formed having intermediate ridges. This constructive design is illustrated below in FIG. 1A, wherein the disadvantages thereof will be elucidated hereafter.

OBJECTS AND FEATURES OF THE INVENTION

A primary object of the present invention is to provide an insert seat of the kind defined above, the support surfaces belonging to each insert seat being formed to give optimal support to the cutting insert mounted in the insert seat.

Another object of the present invention is that the prestress imparted to a cutting insert mounted in an insert seat should remain to a substantial extent after a certain time of use of the cutting insert.

Yet another object of the present invention is that the positioning of the cutting insert in the insert seat should be improved, i.e., the displacement of the cutting insert from an initial position should be limited.

Another object of the present invention is that the manufacture of the insert seat should be achieved in an effective way.

At least the primary object of the present invention is realized by means of a tool body which includes an insert seat for receiving a cutting insert for chip-removing machining. The insert seat includes a bottom surface and support surfaces upstanding from the bottom surface. Each support surface comprises a plurality of ridges wherein adjacent ridges are separated by a groove having a depth greater than zero and no greater than 0.015 mm.

The invention also relates to a tool comprised of the tool body described above and a cutting insert mounted thereon.

BRIEF DESCRIPTION OF THE DRAWINGS

Below, prior art and an embodiment of the invention will be described, reference being made to the accompanying drawings.

FIG. 1A shows a section through a part of an insert seat according to prior art, the abutment of the cutting insert against the support surfaces of the insert seat being shown in detail.

DESCRIPTION OF PRIOR ART AND A PREFERRED EMBODIMENT OF THE INVENTION

From the section shown in FIG. 1A through a part of an insert seat according to prior art, it is seen that the cutting insert S abuts against upstanding support surfaces of the insert seat, each support surface being formed of ridges C, which have been produced by providing the side surface of the insert seat with a number of grooves E. Each ridge preferably lies in a plane oriented parallel to a bottom surface F of the seat. In the example shown, the number of grooves is two and the number of ridges is three. An insert seat of this type is disclosed in SE-C-505 511 (U.S. Pat. No. 6,017,171), which document is briefly discussed above under the heading State of the Art. The cutting insert S is mounted with a certain prestress toward the ridges.

The height D of the ridges C corresponds to the depth of the grooves E, i.e., the distance from the bottom of the grooves E to the peak of the ridges C, and the width B of the grooves E corresponds to the distance between adjacent ridges C.

In the embodiment of prior art shown in FIG. 1A, the cutting insert S abuts against two ridges C, abutment normally being effected only along a limited length of the ridges C, namely the portions that are located in the area of the free (upper) end of the respective support surface. A problem with the insert seat shown in FIG. 1A is that, after a certain time of use, a wearing-in of the cutting insert S in relation to the ridges C takes place. This means that the ridges C are flattened and the cutting insert S is displaced to the right in FIG. 1A. Since the grooves E have a relatively large depth D, which normally is in the interval of $0.02 \leq D \leq 0.07$ mm, this displacement can eventually result in the prestress becoming considerably reduced or even eliminated, whereby the remaining prestress might not be sufficient. This can be an extraordinarily significant disadvantage for the fixation/positioning of the cutting insert S in the insert seat. The width B of the grooves 9 is normally in the interval of $0.7 \leq B \leq 1.2$ mm.

Figure 1:
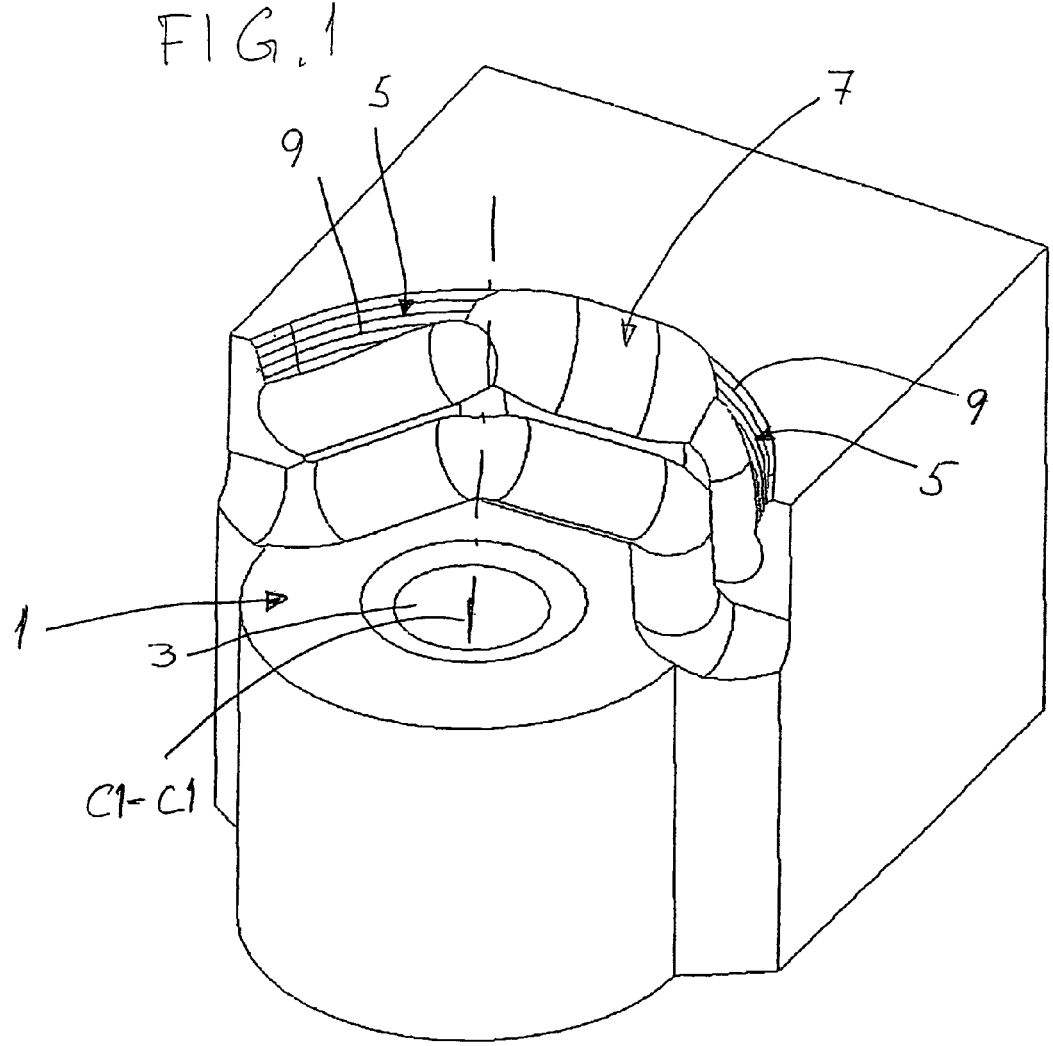
FIG. 1 shows a perspective view of an insert seat according to the present invention.
Figure 2:
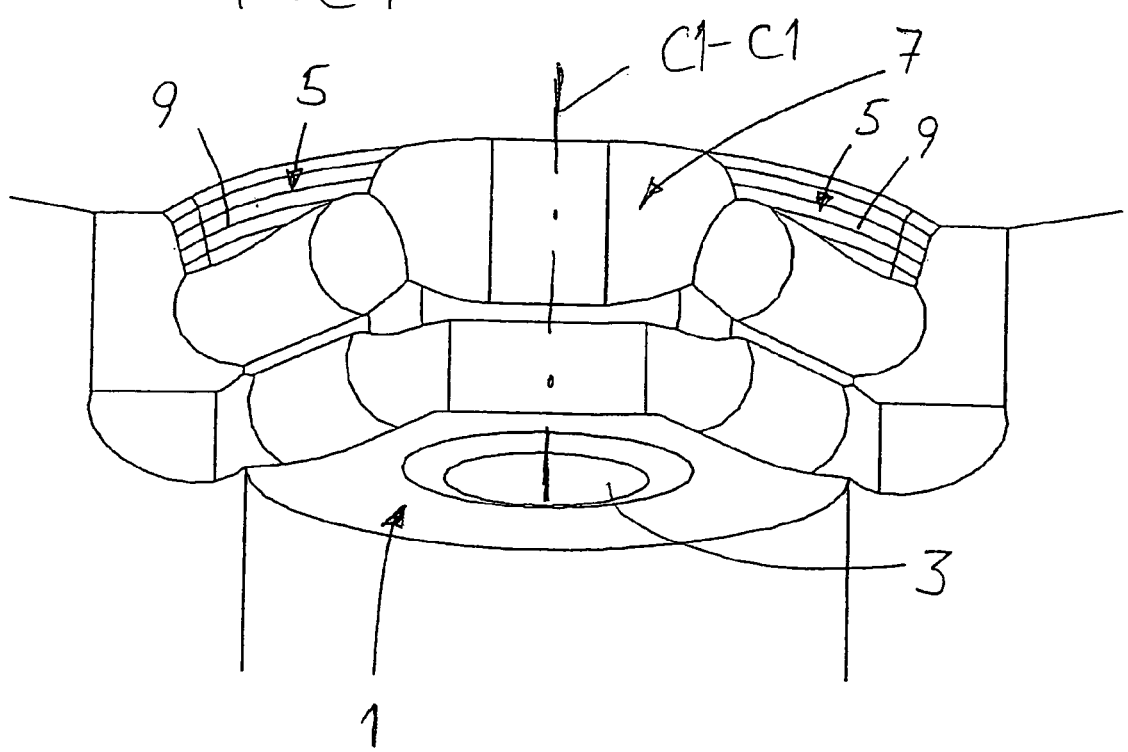
FIG. 2 shows a front view of an insert seat according to the present invention.

The insert seat according to the present invention shown in FIGS. 1 and 2 comprises a bottom surface 1, which carries the cutting insert applied in the insert seat. In the embodiment illustrated, the bottom surface 1 has a generally circular shape, but other shapes are possible. In the center of the bottom surface 1, an internally threaded first center hole 3 is arranged, which is intended to receive a screw for anchoring the cutting insert in the insert seat. A first center axis C1-C1 of the first center hole 3 defines an axial direction of the insert seat. The insert seat shown in FIGS. 1 and 2 also comprises upstanding support surfaces 5, which are located at a certain distance from the bottom surface 1 in the axial direction C1-C1 of the insert seat. Between the support surfaces 5, a recessed clearance surface 7 is arranged. As is seen in FIGS. 1 and 2, the support surfaces 5 have a number of ridges 9, which according to the shown embodiment generally are located in respective planes P (FIG. 5) that are parallel to the bottom surface 1 of the insert seat. In the embodiment shown in FIGS. 1 and 2, the insert seat is provided with four parallel ridges 9 although more or fewer could be present, but most preferably no fewer than three. Normally, the portions of the insert seat located between the support surfaces 5 and the bottom surface 1 do not exert any supporting function on a cutting insert for chip-removing machining applied in the insert seat. That also applies to the portions of the insert seat located between the clearance surface 7 and the bottom surface 1.

Figure 3:
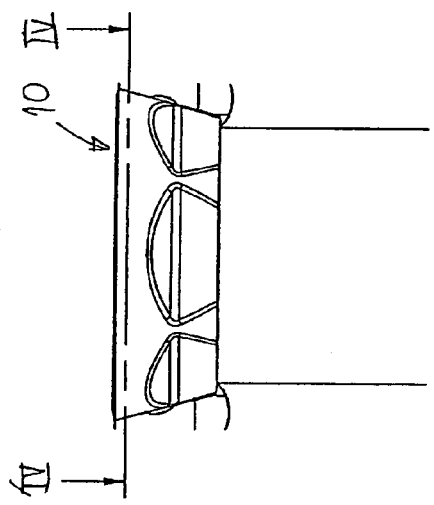
FIG. 3 shows a front view of a cutting insert received in an insert seat according to the present invention.
Figure 4:
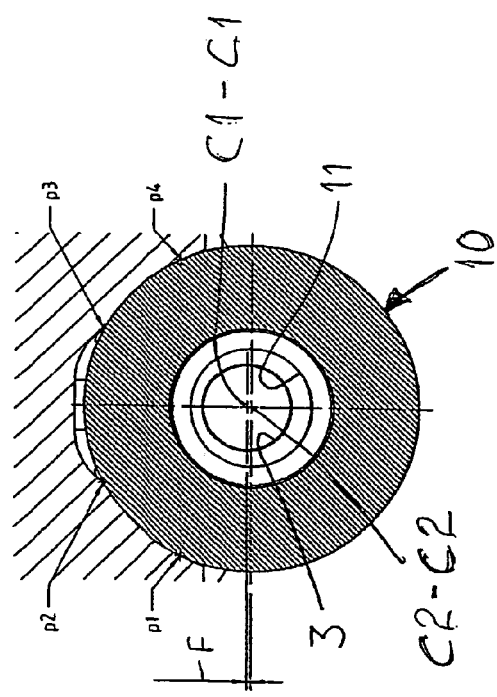
FIG. 4 shows a section according to IV-IV in FIG. 3.

In FIGS. 3 and 4, it is shown how a cutting insert 10 for chip-removing machining is received in the insert seat according to the present invention. The cutting insert 10 is provided with a non-threaded second center hole 11 for the receipt of a screw for the clamping of the cutting insert 10 in the insert seat. As is most clearly seen in FIG. 4, the uppermost located ridges 9 of the support surfaces 5 have, as seen in a direction parallel to the axis C1-C1, a radius of curvature of the same nominal value as the radius of curvature of the part of the cutting insert that abuts against the respective ridge 9. That also applies to the other ridges 9 included in the support surfaces 5. This means that continuous abutment occurs between each ridge 9 and the cutting insert. Thus, contact occurs initially along a curved line, on one hand between the points p1 and p2, and on the other hand between the points p3 and p4 in FIG. 4. The clearance surface 7 does not abut against the cutting insert 10. The portions of the insert seat located outside the points p1 and p4 do not abut against the cutting insert 10.

The cutting insert 10 is mounted in the insert seat by means of a certain prestress. This is illustrated in FIG. 4 by the measure F, which is the distance between the first center axis C1-C1 of the first center hole 3 in the insert seat and a second center axis C2-C2 of the second center hole 11 in the cutting insert 10. Normally, the measure F should be in the interval of $0.1 \leq F \leq 0.3$ mm with a preferred interval of $0.15 \leq F \leq 0.25$ mm.

Figure 5:
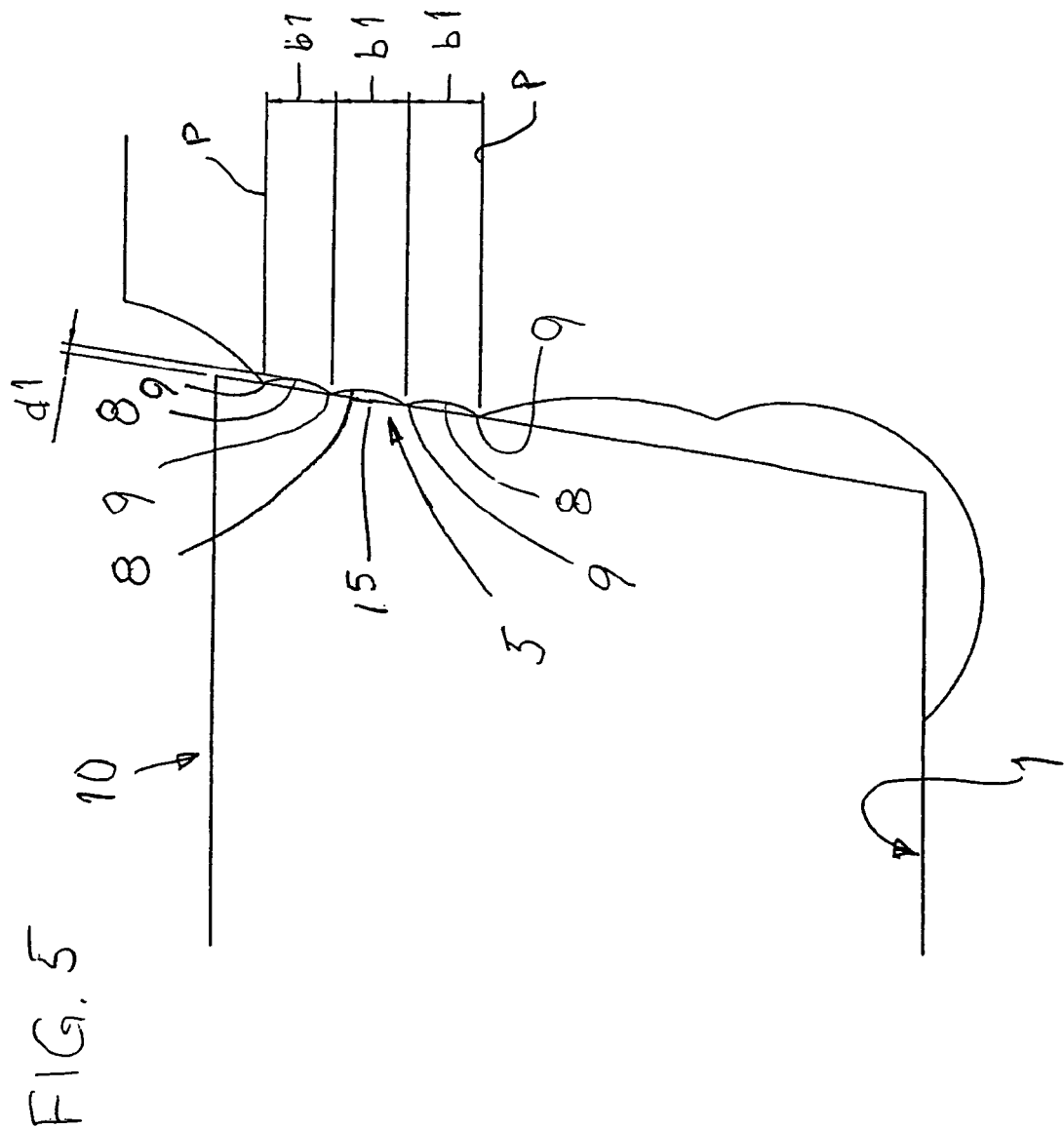
FIG. 5 shows a section in the axial direction through an insert seat having a cutting insert mounted therein, an initial position of the mounting being shown.
Figure 6:
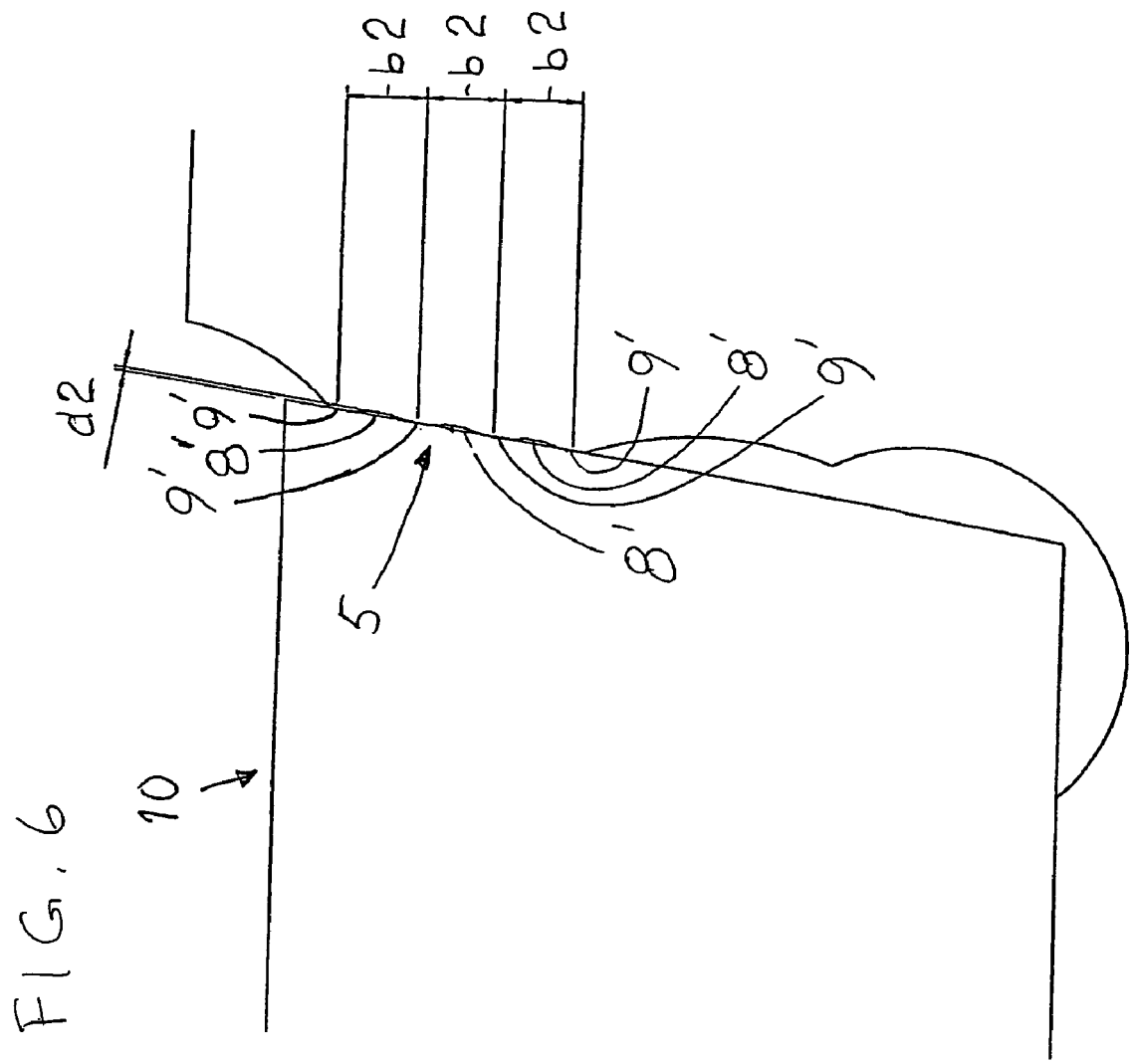
FIG. 6 shows a section in the axial direction through an insert seat having a cutting insert mounted therein, a position after a certain wearing-in being shown.

In FIGS. 5 and 6, it is illustrated how a cutting insert 10 cooperates with a support surface 5 in an insert seat according to the present invention. In FIGS. 5 and 6, it is seen that a support surface 5 is arranged in the insert seat, at a certain distance from the bottom surface 1. As has been pointed out above, the support surface 5 preferably comprises three grooves 8, which generate four ridges 9. In the section shown in FIG. 5, the tips of the four ridges 9 are shown as lying on a common straight line 15, which coincides with the side surface of the cutting insert 10. In FIG. 5, the initial depth of the grooves 8 is designated d1 and the initial width of the grooves 8 is designated b1. The initial depth d1 should be in the interval of $0 < d1 \leq 0.015$ mm with a preferred value of $0.003 \leq d1 \leq 0.01$ mm. The initial width b1 should be in the interval of $0.1 \leq b1 \leq 0.4$ mm with a preferred value of $0.25 \leq b1 \leq 0.35$ mm.

Although the tips of the ridges are shown as lying on a common straight line 15, such an orientation need not occur at the first use of the insert seat. Possibly fewer than all of the tips may be so oriented. In fact, it is possible that only one ridge might make initial contact with the insert. Eventually, however, due to ridge wear, a plurality of the ridge tips will come to lie on the common line 15 and make contact with the insert. After further wearing-in a flattening of the ridges 9 and a diminishing of the groove depth takes place. This is illustrated in FIG. 6, the diminished grooves having been given the reference designation 8' and the flattened ridges the reference designation 9'. Thus, a displacement of the cutting insert 10 has occurred in a direction away from the hole 3, which means that the depth of the grooves 8' has decreased. This reduced depth has been given the reference designation d2. The width of the diminished grooves 8' has been given the reference designation b2, this measure being somewhat smaller than the measure b1, due to the flattening. The flattening of the ridges 9' generally entails results in a greater friction between the side surface 5 and the cutting insert 10. This prevents the cutting insert 10 from rotating in the insert seat.

As noted earlier, the shortening of the groove depth means that the prestress applied to the insert is weakened (i.e., the measure F is shortened). A basic concept of the present invention is that even if a displacement of the cutting insert 10 takes place in the insert seat because of deformation of the ridges 9, there should always remain a satisfactory of deformation of the ridges 9, there should always remain a satisfactory prestress that urges the cutting insert 10 against the support surface 5. From a theoretical point of view, the deformation could progress so far that the ridges 9 are entirely obliterated, i.e., the side surface 5 becomes planar. In practice, tendencies to such a scenario should not occur before the load (i.e., the force acting on the insert during cutting) is greater than the recommended load. If there are tendencies to the above-described scenario, wherein the groove depth is 0.003 to 0.010 mm, the displacement of the cutting insert 10 cannot exceed 0.010 mm. This should be compared with the prestress F that above has been attributed a smallest value of 0.1 mm. Thus, the prestress difference would, in that case, be ten times as great as the maximum expected displacement of the insert. Thus, even if the ridges completely wear away, there will remain a large amount of the prestress distance, i.e., 0.09 mm. That means that there is a satisfactory margin in the relation between prestress and maximum displacement of the cutting insert 10, because only ten percent of the prestress would be lost. That compares favorably with the prior art described above, wherein the displacement of the insert could be up to 0.07 mm, which is seventy percent of a prestress distance of 0.1 mm.

Furthermore, in accordance with the invention, it is preferable to provide more than two ridges 9 whose tips will eventually come to lie on the common line 15 so that the load transferred from the insert to the ridges in the present invention will be greatly distributed, whereby the ridges will be deformed at a slow rate. As can be seen in FIG. 5, five ridge tips engage the insert.

Generally the grooves 9 in the support surfaces 5 are manufactured by means of ball nose end mills, the dimensions of the grooves 9, for instance depth and width, being determined on one hand by the dimensions of the milling cutter and on the other hand by the cutting depth thereof. The diameter of the ball nose end mill is normally in the interval of 1-6 mm.

FEASIBLE MODIFICATIONS OF THE INVENTION

In the sectional views shown above in FIGS. 5 and 6, the support surface 5 has four ridges 9 and three grooves 8 defined between the ridges 9, wherein the tips of the four ridges lie on a common straight line 15. However, the invention is in no way limited to the number of ridges and grooves shown in FIGS. 5 and 6. Thus, within the scope of the invention, there could be at least three ridges, possibly exceeding four whose tips lie on a common straight line 15 (and thus engage the insert).

The present invention is primarily provided for milling cutters for chip-removing machining. However, the concept of the invention is general and may be used also in other types of tools for chip-removing machining. For exemplifying and not limiting purposes, turning tools and drills may be mentioned. In that connection, the cutting inserts for chip-removing machining may also have a different geometry than the one shown in the embodiment according to the above. For exemplifying and not limiting purpose, rectangular cutting inserts, rhombic cutting inserts and triangular cutting inserts may be mentioned. The cutting inserts may be either positive or negative.

In the description above, the planes P of the ridges extend parallel to the bottom surface 1. However, it should be appreciated that the ridges do not need to extend parallel to the bottom surface 1 but rather a certain angle may be present between the longitudinal direction of the ridges and the plane in which the bottom surface 1 is situated (as the ridges are viewed in a direction perpendicular tot he axis C1-C1). Generally it applies that the ridges, in principle, may extend arbitrarily within the circumference defined by the side surface, but it is advisable that there be a mutual coordination between the ridges as for the extension thereof in the side surface. For exemplifying and not limiting purpose, it may be mentioned that the ridges may have a diagonal extension in the side surface.

In the description above, the ridges 9 are arched and located in a plane P. The reason therefor is of course that the ridges should have a shape adapted to the circular cutting insert 10. However, within the scope of the present invention it is also conceivable that inserts having flat sides could be clamped, whereby the ridges would be rectilinear instead of arched. Furthermore, it is conceivable that the ridges, for instance, could be sinusoidal in the longitudinal direction thereof.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A tool body including an insert seat adapted for receiving a cutting insert for chip-removing machining, the insert seat including a bottom surface and support surfaces upstanding from the bottom surface, each support surface comprising a plurality of ridges wherein adjacent ridges are separated by a groove having a depth greater than zero and no greater than 0.015 mm; and wherein said groove has a width (b1) separating said adjacent ridges from one another, the width being in the range of $0.1 <\!/\!= b1 <\!/\!= 0.4$ mm.

2. The tool body according to claim 1 wherein each ridge lies in a plane oriented substantially parallel to a plane defined by the bottom surface.

3. The tool body according to claim 1 wherein the ridges are substantially parallel to one another.

4. The tool body according to claim 1 wherein there is a plurality of grooves forming at least three ridges arranged for contacting the insert; none of the grooves having a depth greater than 00.015 mm.

5. The tool body according to claim 4 wherein there are at least four ridges arranged for contacting the insert.

6. The tool body according to claim 1 wherein tips of the respective ridges of each support surface lie on a common plane intersecting a plane defined by the bottom surface.

7. The tool body according to claim 1 wherein the support surfaces are separated by a clearance.

8. The tool body according to claim 1 wherein the groove depth is from 0.003 to 0.01 mm.

9. A tool for chip-removing machining comprising a tool body including at least one insert seat in which is disposed a cutting insert for chip-removing machining, the at least one seat including a bottom surface and support surfaces upstanding from the bottom surface, each support surface comprising a plurality of ridges, wherein adjacent ridges are separated by a groove having a depth greater than zero and no greater than 0.015 mm, wherein the insert is carried by the bottom surface and abuts against ridges of each support surface;

and wherein said groove had a width (b1) separating said ajdacent ridges from one another, the width being in the range of $0.1 <\!/\!= b1 <\!/\!= 0.4$ mm.

10. The tool according to claim 9 wherein each ridge lies in a plane oriented substantially parallel to a plane defined by the bottom surface.

11. The tool according to claim 9 wherein the insert is mounted in the seat with a prestress toward the support surfaces.

12. The tool according to claim 11 wherein the bottom surface has a threaded first hole formed therein; the insert including a second hole extending therethrough; the insert mounted in the seat by a threaded fastener extending through the second hole and threaded in the first hole, wherein center axes of the first and second holes, respectively, are offset from one another by a distance of offset to create the prestress, wherein the groove depth is shorter than the distance of offset.

13. The tool according to claim 9 wherein the ridges are concavely curved, and a side of the insert engaging the ridges is correspondingly convexly curved.

* * * * *